(12) United States Patent
Anderson et al.

(10) Patent No.: US 7,937,405 B2
(45) Date of Patent: May 3, 2011

(54) SERVING ADVERTISEMENTS BASED ON CONTENT

(75) Inventors: Darrell Anderson, Mountain View, CA (US); Paul Buchheit, Mountain View, CA (US); Alexander Paul Carobus, Mountain View, CA (US); Yingwei Cui, Cupertino, CA (US); Jeffrey A. Dean, Menlo Park, CA (US); Georges R. Harik, Mountain View, CA (US); Deepak Jindal, Mountain View, CA (US); Narayanan Shivakumar, San Jose, CA (US)

(73) Assignee: Google, Inc., Mountainview, CA (US)

( * ) Notice: Subject to any disclaimer, the term of this patent is extended or adjusted under 35 U.S.C. 154(b) by 0 days.

(21) Appl. No.: 12/748,411

(22) Filed: Mar. 27, 2010

(65) Prior Publication Data
US 2010/0185513 A1 Jul. 22, 2010

Related U.S. Application Data

(63) Continuation of application No. 11/487,117, filed on Jul. 14, 2006, now Pat. No. 7,734,624, which is a continuation of application No. 10/375,900, filed on Feb. 26, 2003, now Pat. No. 7,136,875, which is a continuation-in-part of application No. 10/314,427, filed on Dec. 6, 2002, now Pat. No. 7,716,161.

(51) Int. Cl.
*G06F 17/30* (2006.01)

(52) U.S. Cl. ......... 707/770; 707/705; 709/219; 715/738

(58) Field of Classification Search ................... 707/705, 707/706, 709, 770; 709/203, 219; 715/738
See application file for complete search history.

(56) References Cited

U.S. PATENT DOCUMENTS

| | | | | |
|---|---|---|---|---|
| 5,724,521 A * | 3/1998 | Dedrick | ......................... | 705/26 |
| 5,740,549 A * | 4/1998 | Reilly et al. | ............... | 705/14.42 |
| 5,748,397 A * | 5/1998 | Yamada | ........................ | 360/32 |
| 5,754,938 A * | 5/1998 | Herz et al. | ..................... | 725/116 |
| 5,794,050 A * | 8/1998 | Dahlgren et al. | ............. | 717/144 |
| 5,809,242 A * | 9/1998 | Shaw et al. | .................... | 709/217 |
| 5,815,830 A * | 9/1998 | Anthony | ....................... | 707/758 |
| 5,848,407 A * | 12/1998 | Ishikawa et al. | ............... | 707/716 |
| 5,887,133 A * | 3/1999 | Brown et al. | .................. | 709/200 |
| 5,948,061 A * | 9/1999 | Merriman et al. | ............. | 709/219 |
| 6,026,368 A * | 2/2000 | Brown et al. | ............... | 705/14.56 |
| 6,044,376 A * | 3/2000 | Kurtzman, II | ................ | 707/705 |
| 6,078,914 A * | 6/2000 | Redfern | ........................ | 707/705 |
| 6,134,532 A * | 10/2000 | Lazarus et al. | ............. | 705/14.25 |
| 6,144,944 A * | 11/2000 | Kurtzman, II et al. | ..... | 705/14.54 |
| 6,167,382 A * | 12/2000 | Sparks et al. | ................... | 705/26 |

(Continued)

OTHER PUBLICATIONS

Rejection Decision of Chinese Patent Application No. 03824461.6, mailed Sep. 6, 2010 (3 pgs.) with translation (4 pgs.).

*Primary Examiner* — Shahid A Alam
(74) *Attorney, Agent, or Firm* — John C. Pokotylo; Straub & Pokotylo

(57) ABSTRACT

Advertisers are permitted to put targeted ads on page on the web (or some other document of any media type). The present invention may do so by (i) obtaining content that includes available spots for ads, (ii) determining ads relevant to content, and/or (iii) combining content with ads determined to be relevant to the content.

18 Claims, 11 Drawing Sheets

U.S. PATENT DOCUMENTS

| | | | |
|---|---|---|---|
| 6,269,361 B1 * | 7/2001 | Davis et al. | 707/716 |
| 6,308,202 B1 * | 10/2001 | Cohn et al. | 709/217 |
| 6,327,574 B1 * | 12/2001 | Kramer et al. | 705/14.66 |
| 6,356,898 B2 * | 3/2002 | Cohen et al. | 707/716 |
| 6,360,221 B1 * | 3/2002 | Gough et al. | 707/716 |
| 6,366,298 B1 * | 4/2002 | Haitsuka et al. | 715/736 |
| 6,385,592 B1 * | 5/2002 | Angles et al. | 705/14.56 |
| 6,401,075 B1 * | 6/2002 | Mason et al. | 705/14.72 |
| 6,438,539 B1 * | 8/2002 | Korolev et al. | 707/709 |
| 6,449,657 B2 * | 9/2002 | Stanbach, Jr. et al. | 709/245 |
| 6,516,321 B1 * | 2/2003 | De La Huerga | 707/705 |
| 6,584,492 B1 * | 6/2003 | Cezar et al. | 709/203 |
| 6,665,656 B1 * | 12/2003 | Carter | 707/748 |
| 6,665,838 B1 * | 12/2003 | Brown et al. | 715/205 |
| 6,681,223 B1 * | 1/2004 | Sundaresan | 707/705 |
| 6,772,200 B1 * | 8/2004 | Bakshi et al. | 709/217 |
| 6,804,669 B2 * | 10/2004 | Aggarwal | 707/749 |
| 6,892,181 B1 * | 5/2005 | Megiddo et al. | 705/14.41 |
| 6,892,354 B1 * | 5/2005 | Servan-Schreiber et al. | 715/733 |
| 6,985,882 B1 * | 1/2006 | Del Sesto | 705/37 |
| 7,013,298 B1 * | 3/2006 | De La Huerga | 707/705 |
| 7,039,599 B2 * | 5/2006 | Merriman et al. | 705/14.52 |
| 7,136,875 B2 * | 11/2006 | Anderson et al. | 707/705 |
| 7,139,732 B1 * | 11/2006 | Desenberg | 705/37 |
| 2002/0123912 A1 * | 9/2002 | Subramanian et al. | 705/5 |
| 2004/0073485 A1 * | 4/2004 | Liu et al. | 705/14 |
| 2004/0249709 A1 * | 12/2004 | Donovan et al. | 705/14 |

\* cited by examiner

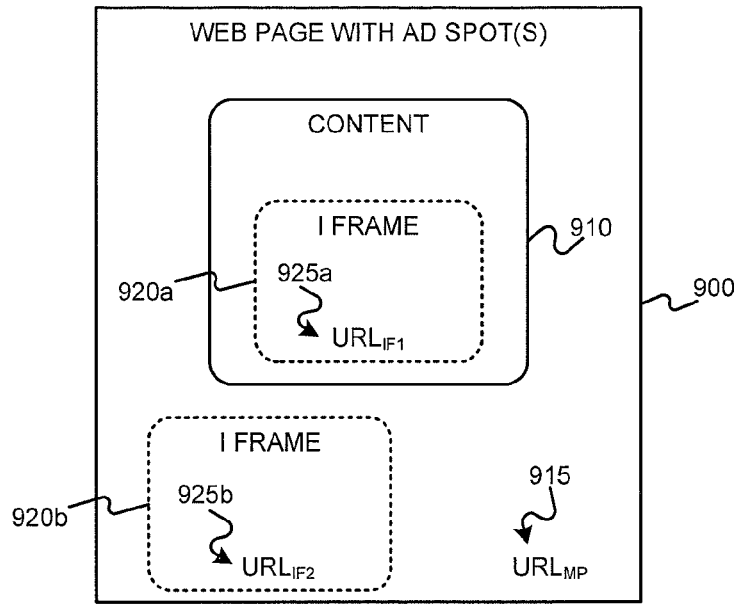
FIGURE 9A
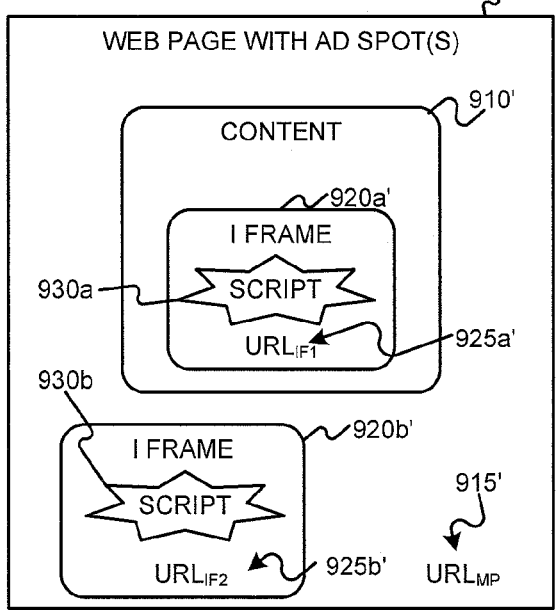
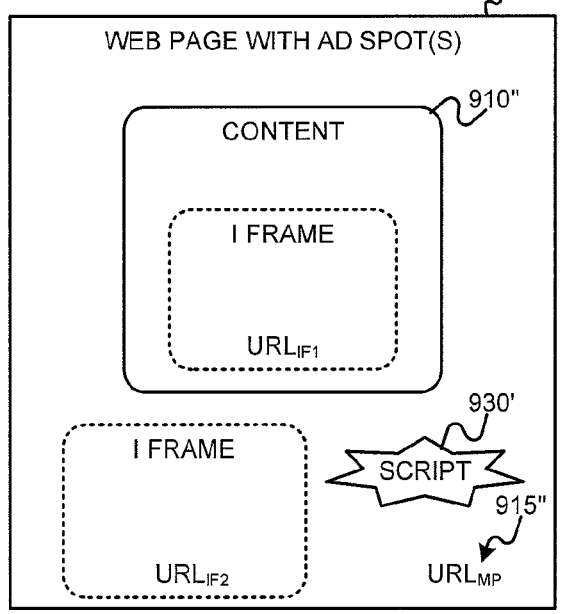

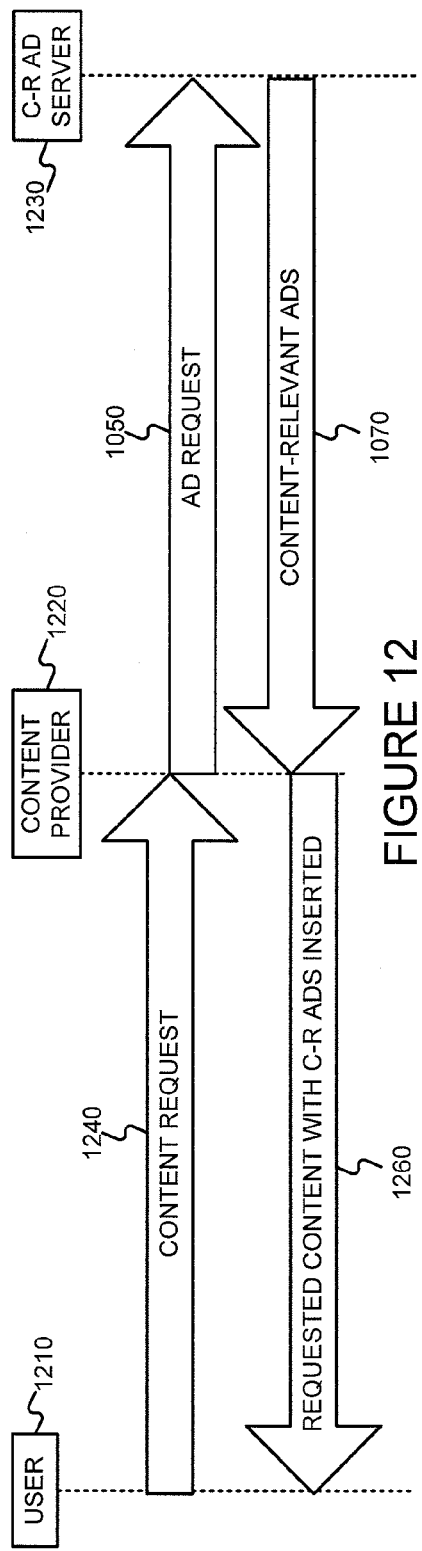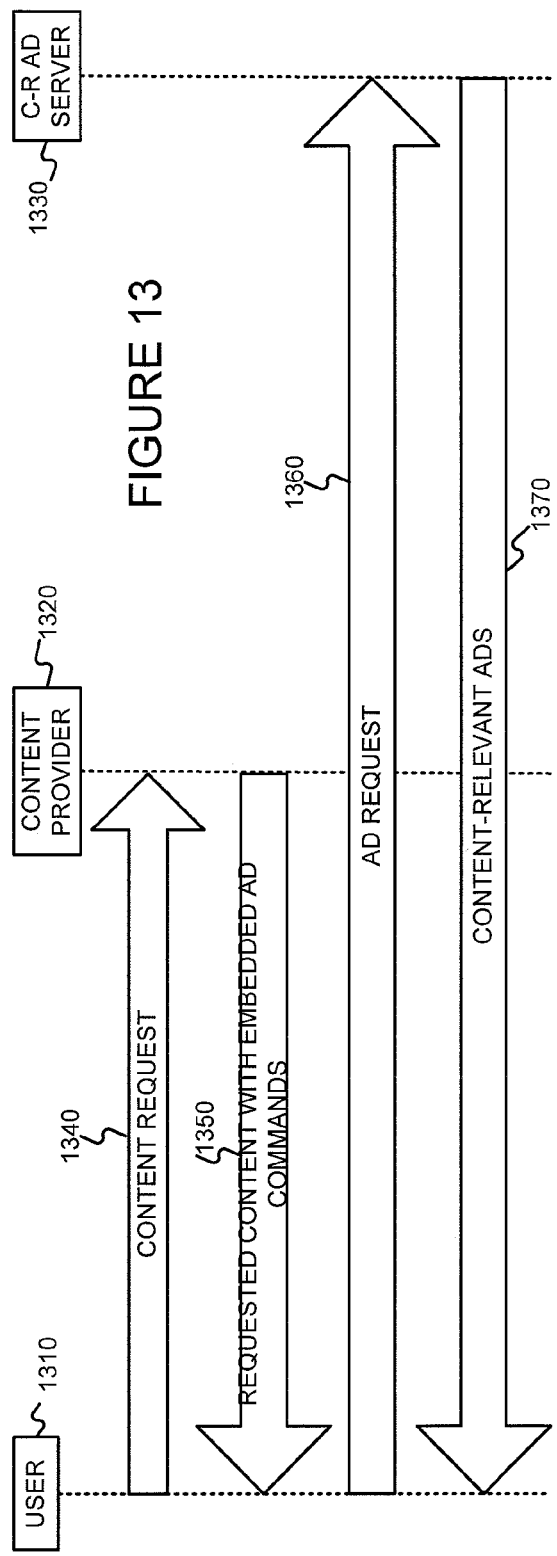

ature of the classifications. Further, manual classification does not scale well to large numbers of Web pages.

SERVING ADVERTISEMENTS BASED ON CONTENT

§0. RELATED APPLICATION

This application is a continuation of U.S. patent application Ser. No. 11/487,117, titled "SERVING ADVERTISEMENTS BASED ON CONTENT", filed on Jul. 14, 2006, now U.S. Pat. No. 7,734,624 and listing Darrell Anderson, Paul Buchheit and Deepak Jindal as inventors, which is a continuation of U.S. patent application Ser. No. 10/375,900, entitled "SERVING ADVERTISEMENTS BASED ON CONTENT", filed on Feb. 26, 2003 now U.S. Pat. No. 7,136,875 and listing Darrell Anderson, Paul Buchheit and Deepak Jindal as inventors, which is a continuation-in-part of U.S. patent application Ser. No. 10/314,427, entitled "METHODS AND APPARATUS FOR SERVING RELEVANT ADVERTISEMENTS", filed on Dec. 6, 2002 now U.S. Pat. No. 7,716,161 and listing Jeffrey A. Dean, Georges R. Harik and Paul Bucheit as inventors, which claims the benefit of U.S. Provisional Application Ser. No. 60/413,536, entitled "METHODS AND APPARATUS FOR SERVING RELEVANT ADVERTISEMENTS", filed on Sep. 24, 2002 and listing Jeffrey A. Dean, Georges R. Harik and Paul Bucheit as inventors. Benefit to these applications is claimed under 35 U.S.C. §§119(e)(1) and 120. The provisional application and utility applications are expressly incorporated herein by reference.

§1. BACKGROUND OF THE INVENTION

§1.1 Field of the Invention

The present invention concerns advertising. In particular, the present invention concerns expanding the opportunities for advertisers to target their ads.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site. An advertiser will normally determine such targeting manually.

Regardless of the strategy, Web site-based ads (also referred to as "Web ads") are typically presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). Many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Web site-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "Overture.com", which hosts a so-called "search engine" service returning advertisements masquerading as "search results" in response to user queries. The Overture.com web site permits advertisers to pay to position an ad for their Web site (or a target Web site) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered in conjunction with a search results page responsive to a query that is relevant, presumably, to the ad. Although search result pages afford advertisers a great opportunity to target their ads to a more receptive audience, search result pages are merely a fraction of page views of the World Wide Web.

Some have attempted to manually map Web pages to one or more categories based on a category taxonomy. Such manual classification of Web pages has numerous disadvantages. First, manual classification can be time consuming, expensive, and prone to inconsistent applications due to the subjectivity of different classifiers. Moreover, given the sheer number of Web pages and the fact that content changes so often, manual classification on a wide scale is impractical.

Thus, it would be useful to allow advertisers to put targeted ads on any page on the web (or some other document of any media type) rather than just search results page. Such a scheme should avoid manual classifications and its inherent, often insurmountable disadvantages.

§2. SUMMARY OF THE INVENTION

The present invention allows advertisers to put targeted ads on any page on the web (or some other document of any media type). The present invention may do so by (i) obtaining content that includes available spots for ads, (ii) determining ads relevant to content, and/or (iii) combining content with ads determined to be relevant to the content.

§3. BRIEF DESCRIPTION OF THE DRAWINGS

FIGS. 9A-9C illustrate parts of a Web page and various locations of script for extracting content of the Web page.

FIGS. 12 and 13 are messaging diagrams illustrating alternative ways to combine content-relevant ads with a document.

§4. DETAILED DESCRIPTION

The present invention may involve novel methods, apparatus, message formats and/or data structures for allowing advertisers to put targeted, content-relevant ads on any page on the web (or some other document of any media type). The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as any patentable subject matter described.

In the following, environments in which, or with which, the present invention may operate are described in §4.1. Then, exemplary embodiments of the present invention are described in §4.2. Examples of operations are provided in §4.3 Finally, some conclusions regarding the present invention are set forth in §4.4.

§4.1 Environments in which, or with which, the Present Invention May Operate

§4.1.1 Exemplary Advertising Environment

Figure 1:
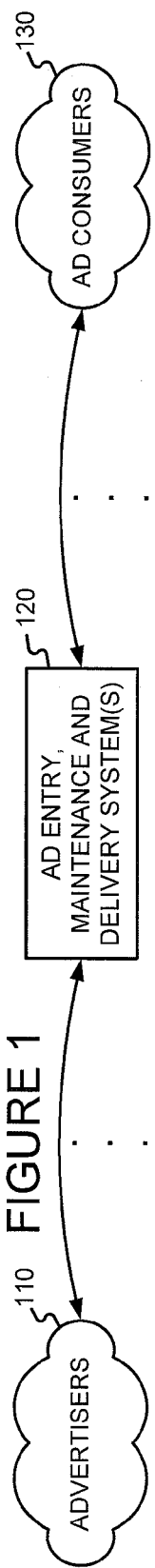
FIG. 1 is a high-level diagram showing parties or entities that can interact with an advertising system.

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, meta information, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the viewer. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

Figure 3:
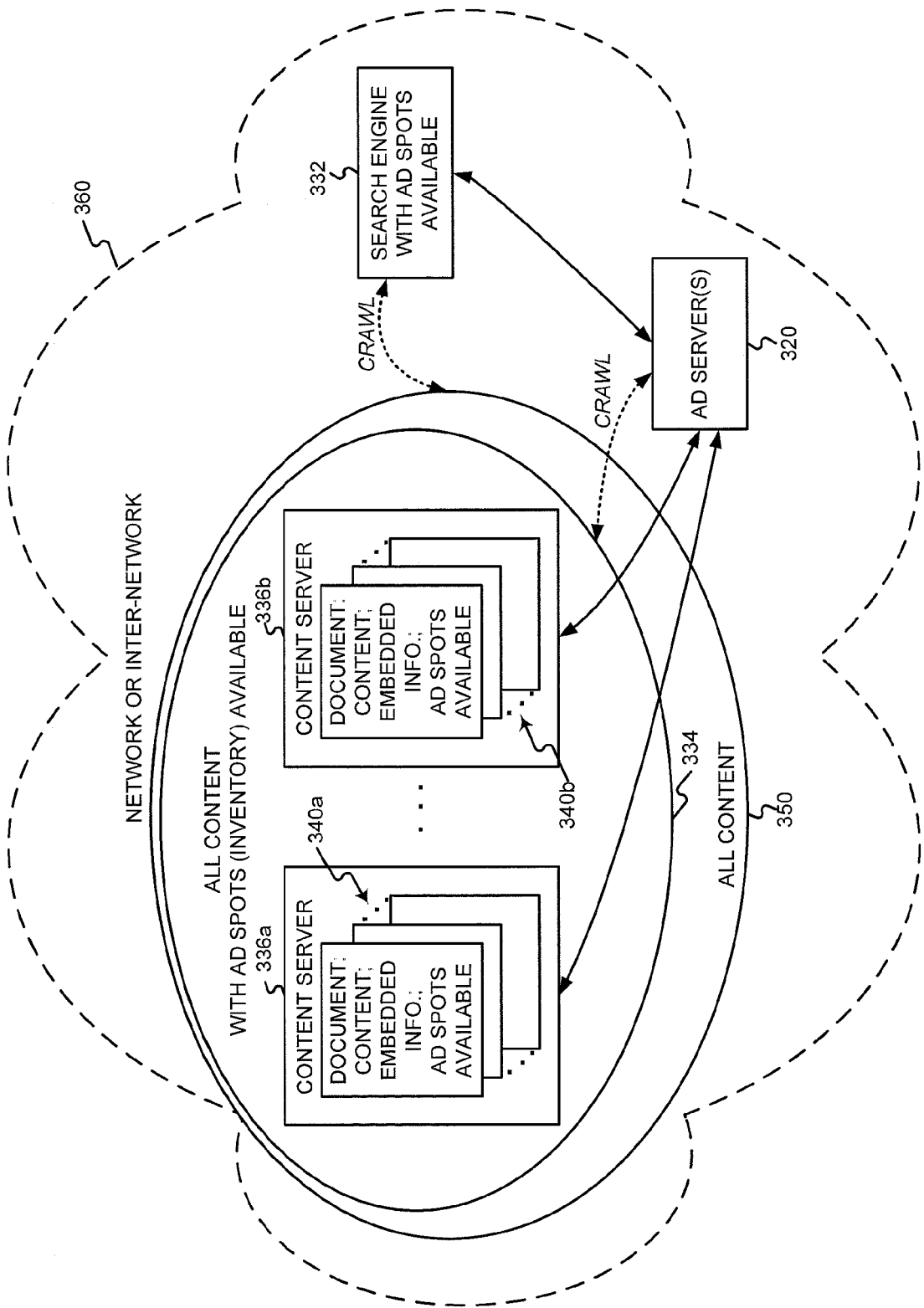
FIG. 3 illustrates an environment in which advertisers can target their ads on search results pages generated by a search engine and/or documents served by content servers.

As can be appreciated from the foregoing, an ad entry, maintenance and delivery system(s) 120 may server ad consumers 130 such as content servers and search engines. As discussed in §1.2 above, the serving of ads targeted to the search results page generated by a search engine is known. The present invention further permits the serving of ads targeted to documents served by content servers. For example, referring to the exemplary environment of FIG. 3, a network or inter-network 360 may include an ad server 320 serving targeted ads in response to requests from a search engine 332 with ad spots for sale. Suppose that the inter-network 350 is the World Wide Web. The search engine 332 crawls much or all of the content 350. Some 334 of this content 350 will include ad spots (also referred to as "inventory") available. More specifically, one or more content servers 336 may include one or more documents 340. Documents may include content, embedded information such as meta information and machine executable instructions, and ad spots available. Note that ads inserted into ad spots in a document can vary each time the document is served. Alternatively, ads inserted into ad spots can have a static association with a given document. As will be described in more detail below, an ad server may use the results of a separate crawl of the some or all of the content with ad spots available 334.

§4.1.2 Exemplary Ad Entry, Maintenance and Delivery Environment

Figure 2:
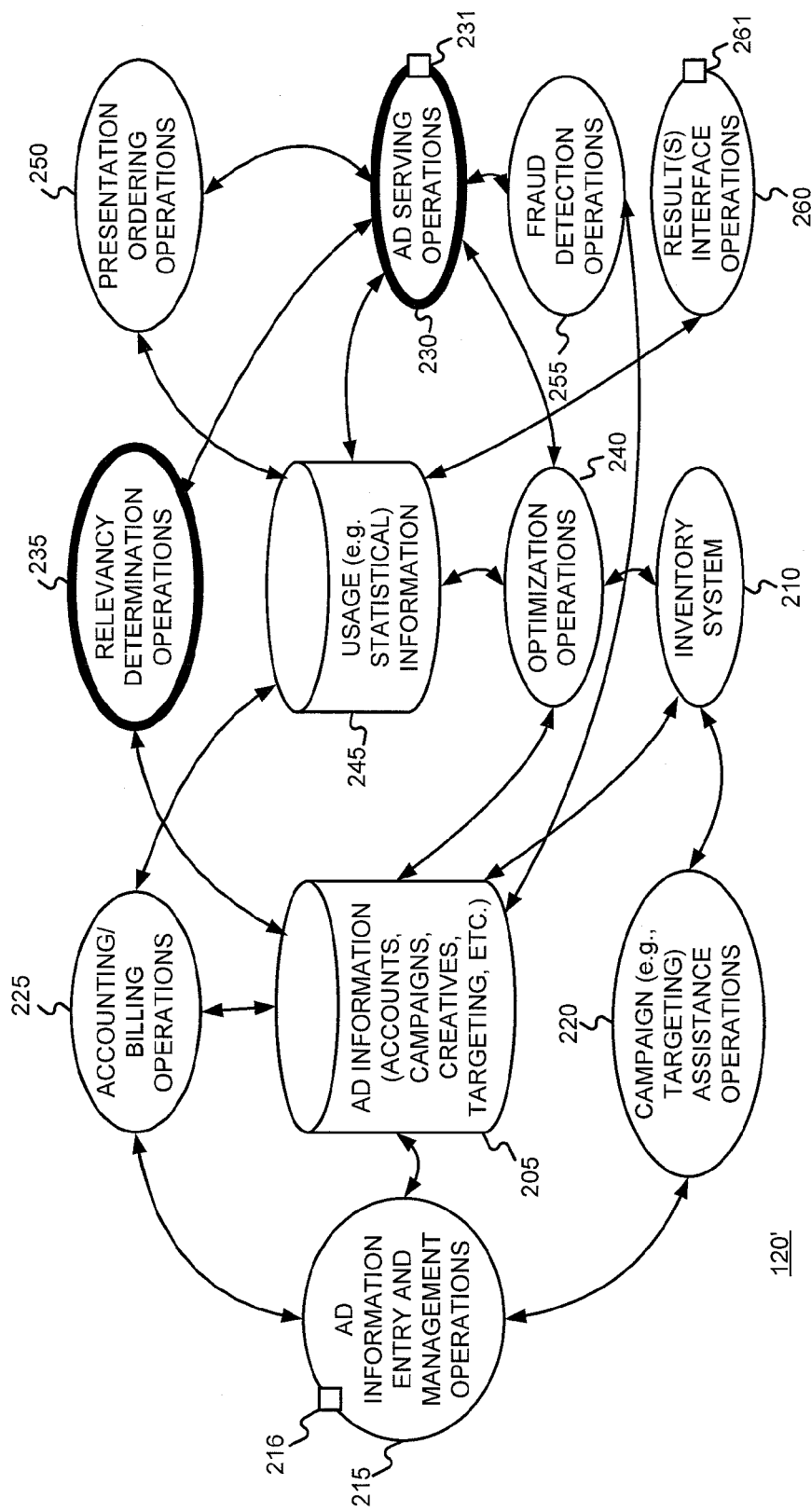
FIG. 2 is a bubble chart of an exemplary advertising environment in which, or with which, the present invention may operate.

FIG. 2 illustrates an exemplary ad system 120', consistent with principles of the present invention. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. Finally, the ad serving operations 230 may use relative presentation attribute assignment operations 250 to order the presentation of the ads to be returned. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

§4.1.3 definitions

Online ads, such as those used in the exemplary systems described above with reference to FIGS. 1 and 2, or any other system, may have various features. Such features may be specified by an application and/or an advertiser. These features are referred to as "ad features" below. For example, in the case of a text ad, ad features may include a title line, ad text, executable code, an embedded link, etc. In the case of an image ad, ad features may additionally include images, etc. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad is served (including one or more topics or concepts determined to be associated with the page, information or content located on or within the page, information about the page such as the host of the page (e.g. AOL, Yahoo, etc.), the importance of the page as measured by e.g. traffic, freshness, quantity and quality of links to or from the page etc., the location of the page within a directory structure, etc.), a search query or search results associated with the serving of the ad, a user characteristic (e.g., their geographic location, the language they use, the type of browser used, previous page views, previous behavior), a host or affiliate site (e.g., America Online, Google, Yahoo) that initiated the request that the ad is served in response to, an absolute position of the ad on the page on which it is served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as conditions or constraints. When used as serving conditions or constraints, such serving parameters are referred to as simply "serving constraints". For example, in some systems, an advertiser may be able to specify that its ad is only to be served on weekdays, no lower than a certain position, only to users in a certain location, etc. As another example, in some systems, an advertiser may specify that its ad is to be served only if a page or search query includes certain keywords or phrases.

"Ad information" may include any combination of ad features, ad serving constraints, information derivable from ad features or ad serving constraints (referred to as "ad derived information"), and/or information related to the ad (referred to as "ad related information"), as well as an extensions of such information (e.g., information derived from ad related information).

A "document" is to be broadly interpreted to include any machine-readable and machine-storable work product. A document may be a file, a combination of files, one or more files with embedded links to other files, etc.; the files may be of any type, such as text, audio, image, video, etc. Parts of a document to be rendered to an end user can be thought of as "content" of the document. Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

Various exemplary embodiments of the invention are now described in §4.2.

§4.2 Exemplary Embodiments

Figure 4:
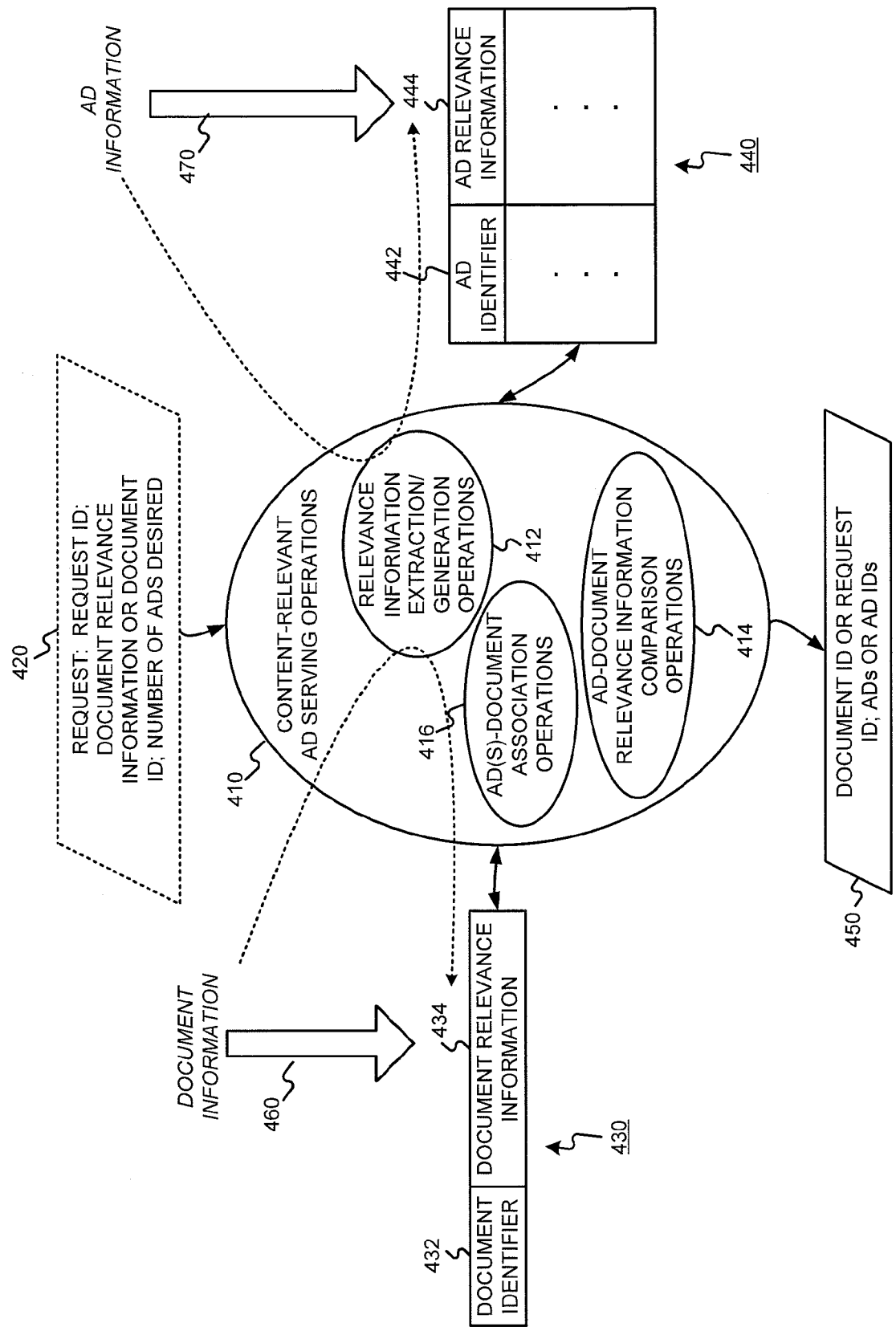
FIG. 4 is a bubble chart of exemplary content-relevant ad serving operations and information used or generated by such operations, consistent with the present invention.

FIG. 4 is a bubble diagram of operations that may be performed and information that may be used or generated, in a manner consistent with the principles of the present invention. Content-relevant ad serving operations 410 may include relevance information extraction/generation operations 412, ad-document relevance information comparison operations 414 and ad(s)-document association operations 416. Responsive to a request 420, or some other trigger event or condition, the content-relevant ad serving operations 410 can extract and/or generate document relevance information 434 and ad relevance information 444. (See operations 412.) Alternatively, such relevance information may have been extracted and/or generated, or otherwise provided before receipt of the request 420. That is, as indicated by the dotted arrows in FIG. 4, ad information and/or document information may be preprocessed to determined ad relevance information 444 and/or document relevance information 434. Exemplary techniques for extracting and/or generating document relevance information 434 and ad relevance information 444 are described in §4.2.2 below. Then, the content-relevant ad serving operations 410 can compare document relevance information 434 for a given document (e.g., a document identified in request 420) 432 to ad relevance information 444 for one or more ads 442. (See operations 414.) Exemplary techniques for determining the relevance of ads to a document are described in §4.2.3 below. As a result of such comparisons, the content-relevant ad serving operations 410 can generate associations of a document (e.g., via a document identifier or a request identifier associated with a document) with one or more ads (e.g., via the ad itself or an ad identifier). (See operations 416.) One such association 450 is shown. Exemplary techniques for associating one or more ads with a document are described in §4.2.3 below.

The content-relevant ad serving operations 410 may use stored data 430 which includes a document identifier (such as a URL for a Web page document for example) 432 and document relevance information 434. As indicated by the arrow 460, document relevance information 434 may be, or may have been, generated based on document information. Exemplary techniques for gathering document information are described in §4.2.1 below. The content-relevant ad serving operations 410 may also use stored data 440 which includes a number of entries, each entry including an ad identifier 442 and ad relevance information 444. As indicated by the arrow 470, ad relevance information 444 may be, or more have been, generated based on ad information.

Ultimately, one or more ads determined to be relevant to a document may be combined with the document to be served. Exemplary techniques for combining the one or more content-relevant ads with the document are described in §4.2.4 below.

§4.2.1 Increasing Inventory of Ad Spots—Obtaining Documents and Extracting and/or Generating Relevance Information Referring to FIG. 4, recall that document relevance information 434 is determined from document information. Various ways of obtaining document information are described in this section. Although many of the following examples are described in the context of Web page documents identified by a URL, the present invention is not limited to these examples.

There are many ways to obtain the document information (e.g., Web page contents). First, for example, document information may be provided by a third party, such as a Web site host or ad consumer. Such provided document information may include the content (information) located within the document, or other information (e.g. a URL) that allows such information to be obtained. Second, document information (e.g. Web page contents) may be obtained during an ad request; for example, an end user's content rendering application (e.g., a browser) may be instructed to send document information (e.g., Web page contents) during an ad request, or the document information may be fetched, for example, as part of content relevant ad serving operations 410. Third, document information (e.g., Web page contents) may be prefetched (i.e., obtained before a specific request) for future content-relevant ad targeting. Moreover, other methods exist for obtaining document information, such as for example the methods disclosed in U.S. patent application Ser. No. 10/113,796 titled "METHOD AND APPARATUS FOR INCREASING EFFICIENCY FOR ELECTRONIC DOCUMENT DELIVERY TO USERS" filed Mar. 29, 2002, U.S. patent application Ser. No. 09/734,886 titled "HYPERTEXT BROWSER ASSISTANT" filed Dec. 13, 2000, and U.S. patent application Ser. No. 09/734,901 titled "SYSTEMS AND METHODS FOR PERFORMING IN-CONTEXT SEARCHING" filed Dec. 13, 2000, each of which is herein incorporated by reference.

Figure 5:
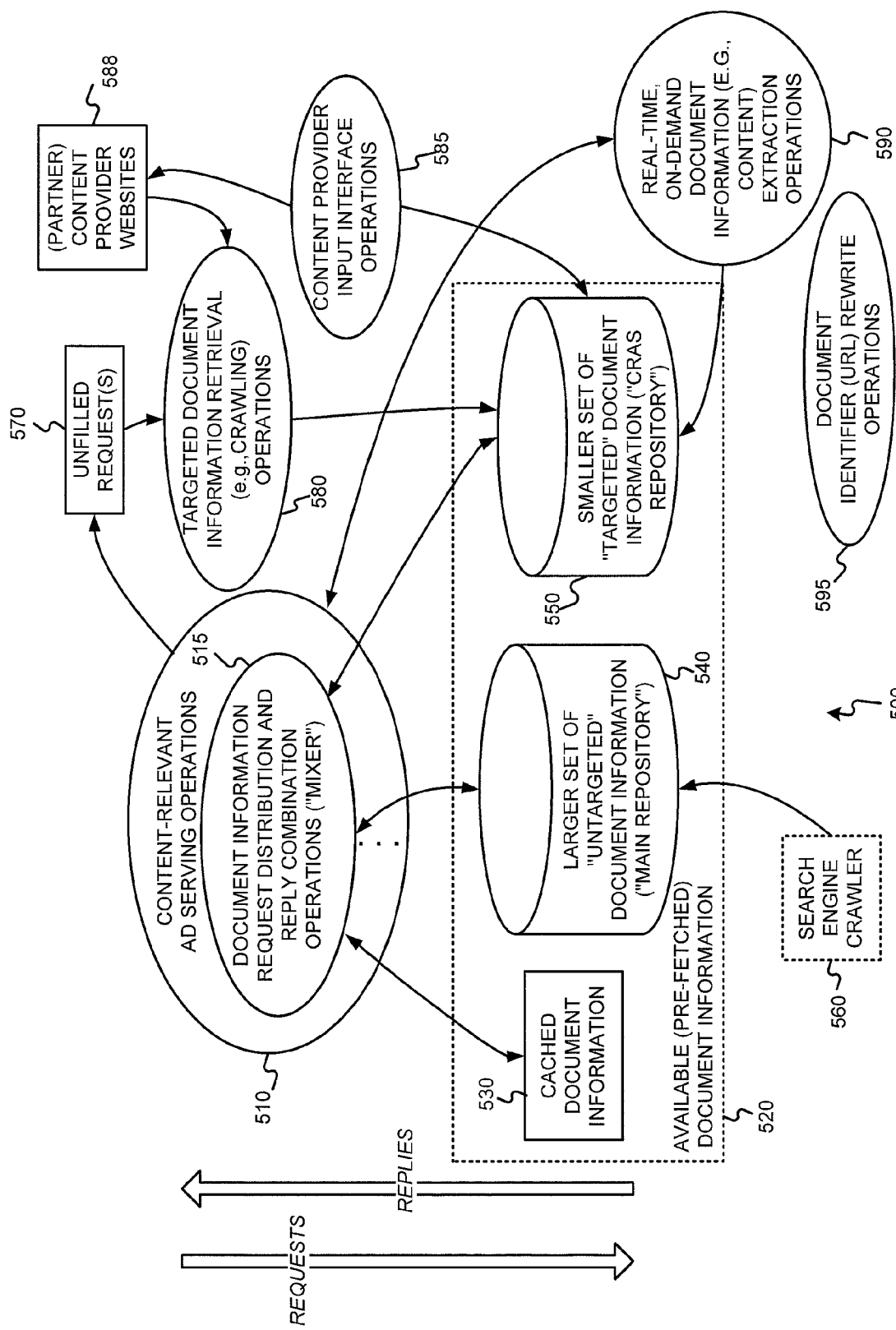
FIG. 5 is a bubble chart of exemplary content-relevant ad serving operations, document information gathering operations, and information used or generated by such operations, consistent with the present invention.

FIG. 5 is a bubble diagram of an exemplary embodiment 500 of operations that may be performed and information that may be used or generated when obtaining documents for increasing ad inventory, in a manner consistent with the principles of the present invention. Content-relevant ad serving operations 510 serve requests for document information (or ad information) and may include document information request distribution and reply combination operations 515. (Note that ad information, or ad relevance information, as well as operations such as relevance information extraction/generation operations 412, ad-document relevance information comparison operations 414 and ad(s)-document association operations 416 are not shown in FIG. 5 to simplify the Figure.) These operations 515 may be used if multiple sources of available (pre-fetched) document information 520 (or ad information) are to be considered. Sources of document information may include one or more of cached document information 530, a larger set of "untargeted" document information 540, and a smaller set of "targeted" document information 550. Generally, a crawl (or some other manner of retrieval) of targeted documents will be "deeper" (e.g., crawl further down into the hierarchical Web pages of a Website) than an untargeted crawl, which may only perform a shallow crawl of a given Web site. As indicated by the arrows at the left margin of FIG. 5, requests for document (or ad) information are advanced down the double arrow lines in the Figure, and replies responsive to such requests are advanced up the double arrow lines in the Figure.

Documents with static information or relatively static information can be fetched in advance (pre-fetched), but may be fetched in real-time, for example on-demand in response to a request. On the other hand, it may be preferable to fetch documents with dynamic information in real-time, responsive to a request.

§4.2.1.1 Pre-Fetching Documents

The cached document information 530 may include document information for recently and/or frequently requested documents.

The larger set of "untargeted" document information 540 may have been built, and may be updated, using a search engine crawler 560. An exemplary search engine crawler 560 is described in U.S. Pat. No. 6,285,999, which is incorporated herein by reference. Although information about a large set of documents is available, information about a particular document needed might not be available. In this case, in a so-called non-blocking implementation of the present invention (where the content-relevant ad request serving operations do not wait to get document information if it has not been previously obtained and presently stored), a request for ads for a document without available document information might be provided with so-called "house ads" (ads for the ad server itself, ads shown for free, or some other ads that don't generate revenue), or with random ads or generally well performing ads if ad revenue is based on a user action (e.g., a click-through or a conversion). (Note that if random ads or generally well performing ads are served in such an untargeted way, their performance statistics, if any, should not be affected. Alternatively, it may be desirable that, when a request for ads for a document without normally available document information is received, a "best guess" is made to estimate document information. Such an estimate might be made by, for example, examining the document's location within a directory structure and using information from the directory (categories) or from other documents in the same, similar, or higher (broader) or lower (narrower) classification. One could also examine a log of search queries that generated search results including or traffic to the document, and from the search queries discern alternative documents related to the document in question. It is further possible that, in such a situation, the Web site host of the document is contacted and provides the information.

The smaller set of "targeted" document information 550 may be obtained and maintained in one or more of a number of ways. For example, targeted document information retrieval (e.g., crawling) operations 580 may be used to crawl particular content provider Websites, such as partner Websites 588. Some or all of the partner Websites may have been entered via content provider input interface operations 585. Alternatively, or in addition, a content provider, such as a Web publisher, can itself provide document information (e.g., Web pages or URLs of newly added Web pages) 550 directly via content provider input interface operations 585.

A self service syndication method can allow content providers such as publishers to sign up to put content-relevant ads on their Website through a fast, easy and standard process. One specific example of such a self service syndication method may support one or more of the following:

(i) Publisher goes to login page/new user page.
(ii) Publisher clicks on new user.
(iii) Publisher fills out its name, who it wants the check written to, address where it wants the check sent, site domain, contact information, (social security number or tax id number, password with email login, etc.). This information may be reviewed against a standard checklist to ensure that the entered Website is a real Website.
(iv) The entered Website may then be approved or denied.
(v) Email may be sent to the publisher
(vi) If approved, the publisher may be instructed to accept a service agreement and click on a link which takes them to a login page.
(vii) Once logged in, the publisher can download a piece of code for a horizontal (486×60) or vertical (660×120) ads with a unique identifier. In one embodiment, unique pieces of code are provided for different ad servers.
(viii) Publisher may then put the code in their ad server.

Other self service features may support:

(i) Publisher can log into its account to see how much money it has earned. Reports may include date, page views, revenue earned, etc.
(ii) Publisher may be given the option to include URLs they want to block for ads.
(iii) Publisher may be paid periodically (e.g., each month) for the ads shown on their Website, possibly subject to the ad being selected and/or a conversion.
(iv) Publisher should have way to change their contact information.

It is desirable to allow a content-relevant ad server administrator to:

(i) See where a specific publisher is showing ads.
(ii) Generate revenue per publisher/all publisher report for any timeframe.
(iii) Mark publisher as fraudulent.
(iv) Mark who was paid.

Figure 6:
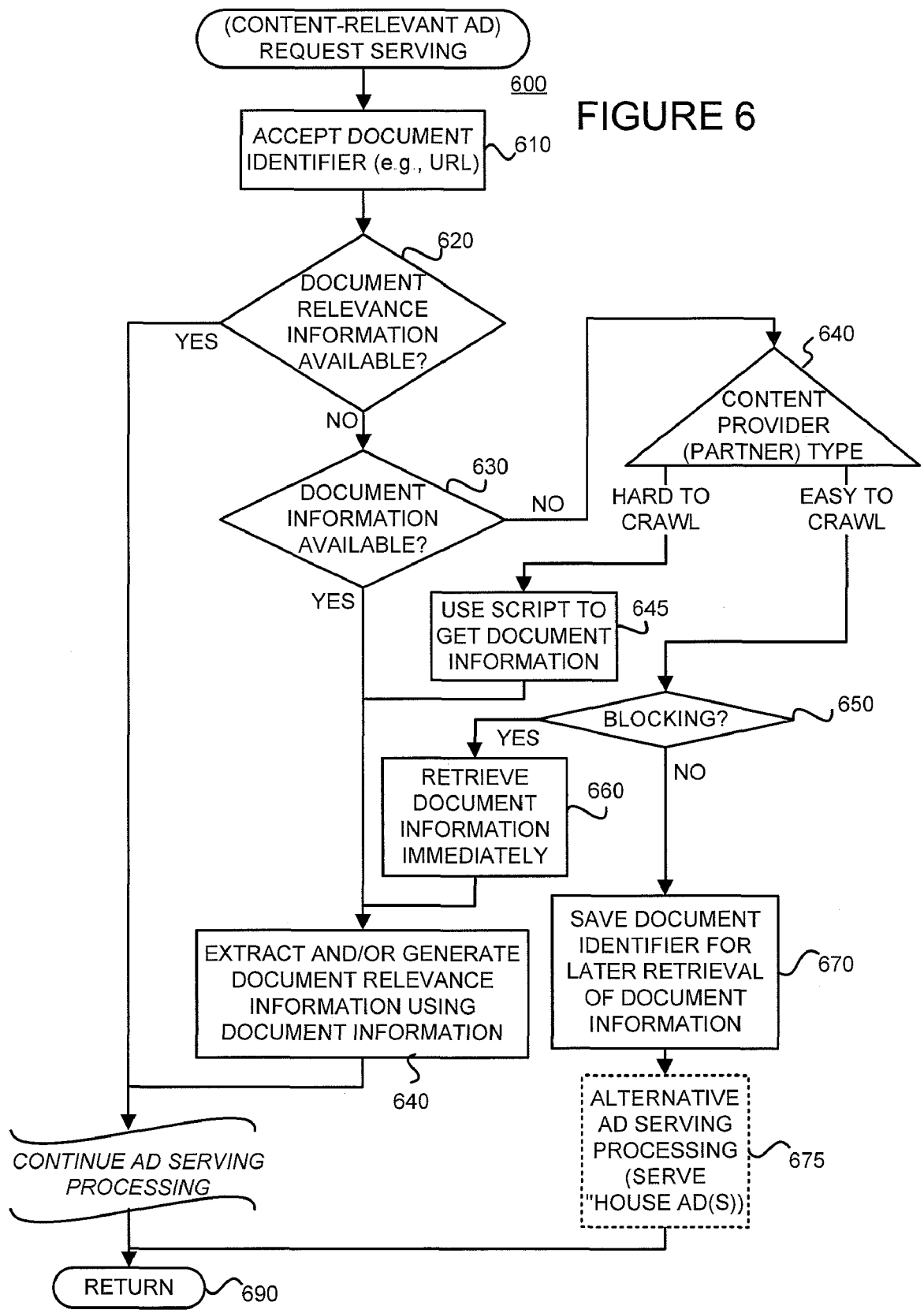
FIG. 6 is a flow diagram of an exemplary method that may be used to get document information as a part of content-relevant ad serving operations in a manner consistent with principles of the invention.

FIG. 6 is a flow diagram of an exemplary method 600 that may be used to get document information as a part of content-relevant ad serving operations in a manner consistent with principles of the invention. The document identifier (e.g., URL) is accepted. (Block 610) It is then determined if the document relevance information is available. (Decision block 620) If the document relevance is available (referred to as a "hit"), the ad serving processing continues using the document relevance information. If, on the other hand, the document relevance information is not available, it is determined whether document information is available (e.g., in the cache 530, the main repository 540, and/or the CRAS repository 550). (Block 630) If so, document relevance information is extracted and/or generated using the document information (Block 640) and the ad serving processing continues. If not (referred to below as a "miss"), it may be determined whether or not the content provider (e.g., a partner) has documents that can be easily retrieved (e.g., crawled) or not. (Block 640) In the context of Web sites, a Web site may be considered to be difficult to crawl if (a) the content is dynamically assembled, (b) the content frequently changes or is frequently refreshed (e.g., news or stocks), and/or (c) the Web site has many alternatives (e.g., people finders). If the content provider is harder to crawl, and it has properly embedded script or links in their content, executable instructions (e.g., Javascript) may be used to get document information (Block 645) before the method 600 continues at block 640. If the content provider is easier to crawl, is is determined whether the content-relevant ad server is configured to use blocking or non-blocking ad serving. (Decision block 650) If the type is blocking, the document information is retrieved immediately (Block 660) and the method 600 either continues at block 640. If, on the other hand, the type is non-blocking, the document identifier (e.g., URL) is stored (e.g., to a log of unfilled requests 570) for later retrieval. (Block 670) Alternative ad serving may then be performed. (Block 675). Note that, if the document relevance information is not available, a "best guess" may also be used, as disclosed previously.

Referring again to FIG. 5, the targeted document information retrieval (e.g., crawling) operations 580 may then processes the logs of unfilled request(s) 570 (and identifiers, such as URLs, of (partner) content provider Web sites provided by an external source, such as a (partner) content provider Web site) and retrieves related document information into the CRAS repository 550 for future use. The targeted crawling operations 580 may also be used to pre-crawl Web pages for a given Website to "pre-warm" the CRAS repository 550. This helps to ensure that content-relevant ads will be available.

Figure 7:
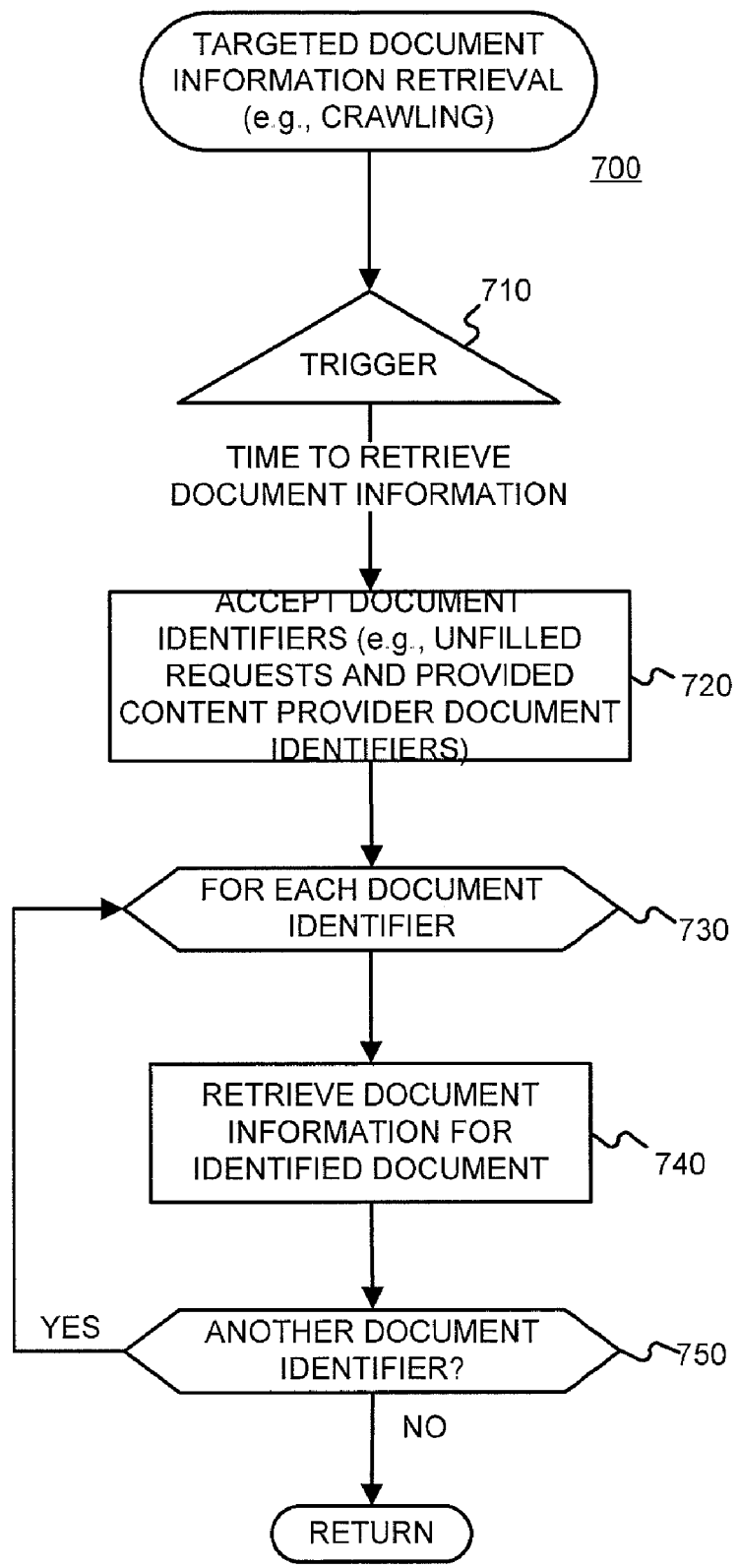
FIG. 7 is a flow diagram of an exemplary method that may be used to effect targeted document information retrieval in a manner consistent with principles of the invention.

FIG. 7 is a flow diagram of an exemplary method 700 that may be used to effect targeted document information retrieval in a manner consistent with principles of the invention. In response to some trigger event 710, the document identifiers are accepted. (Block 730) For each document identifier (Loop 730-750), document information for the identified document is retrieved. (Block 740)

In the case of Web page documents identified by URLs, the URLs of such Web pages may include information that varies across sessions used to distinguish different sessions on the same Web page. Such additional information, such as sessionids, shopperids, etc., are often appended to the URL. However, when stripped on this additional information, a given URL will address the same Web page content. If session information were not removed from a URL, stored document information associated with the URL without the session information might not be found using the URL with the session information as a key. That is, even though the Web page content (or some other document information) is already available, it might be considered to be unavailable due to the session information in the URL. Document identifier (URL) rewrite operations 595 may be provided to strip such session information from URLs and make them canonical for purposes of providing search keys to store and lookup document information stored in the repositories 540,550 and the cache 530.

The targeted document information retrieval operations 580 may work in cooperation and conjunction with the search engine crawler 560 (which may complete a crawl of the Web less frequently). For example, in one embodiment, it may be desired to have the targeted document information retrieval operations 580 be a Web crawler that works with a small number of Web pages per day (e.g., <2.5M Web pages/day). In such an embodiment, it 580 may be used primarily as a supplement to the search engine crawler 560 to meet freshness criteria and/or to reduce time lag to launch a partner site. It may be desirable to pass as much of the ongoing workload to the search engine crawler 560 as possible. In such as case, it may be desirable (i) to write to a log the URLs for which there is no document information stored, (ii) for the search engine crawler 560 to pick up the document information and supplement its own repository 540. Over time, the main repository 540 should have more of the document information that will be needed.

§4.2.1.2 Real-Time Fetching

There is often content that can not be crawled. Dynamic Web pages, such as those generated using a search engine, are one such example. Other examples include pages generated by filling forms, personalized pages, pages that require a login and password, etc. Real-time document information extraction operations 590 may be used to extract contents of such Web pages, as well as Web pages that haven't been pre-fetched, but (the context of which) are needed. In one embodiment, the document information (e.g., contents) are extracted using embedded instructions (e.g., Javascript) included in a document. More specifically, the embedded instructions (e.g., Javascript) may send some of all of the document information (e.g., content) to the content-relevant ad serving operations 410 to get one or more targeted ads for the dynamic document. "Interesting" document information to be extracted a Web page could include meta tags, headers, titles, etc. The content extraction and fetching occur in real-time.

In one embodiment of the invention, Javascript is used in the context of a proxy. This Javascript extracts "interesting" document information such as meta tags, header, titles, etc., from any Web page it is available on. A target page could include the following Javascript as embedded instructions:

```
<iframe id='google_ads_frame' src='about:blank' hight=80 ... >
...
content of the page
....
<script>
extract important key words like title, meta tags, headers etc, till we
have reached 1K byte limit.
frames['google_ads_frame'].src=http://pagead.google.com/ads?url=<
url>&contents=word1+word2+....
</script>
```

Setting the URL of the iframe instructs the browser to reload the frame. This Javascript could be provided to content servers for insertion into all their Web pages.

Although the foregoing embodiment of a real-time document information extraction operations 590 is useful, it has some disadvantages. First, this Javascript is rather large and could be slow to execute on a per-page basis. Second, changes to improve the actual Javascript over time (e.g., with respect to what content it extracts and how) would have to be accepted and implemented by content providers, without unintentionally modifying it. Thus, generally, with such an implementation, the bigger the Javascript and the more often it is updated, the more likely there may be different, incompatible versions being used.

One alternative to embedded Javascript is to provide a static Javascript link. More specifically, to avoid increasing the size of each Web page by 4 KBytes or so by embedding Javascript, a link to a static Javascript page can be used instead. The following is an example of a link to a static javascript page:

```
<script src=pagead.google.com/ads/scrape.js> </script>
```

Since most browsers will cache this Javascript link, the actual Javascript will only be fetched infrequently.

A second alternative avoids sending 1 KBype of content unconditionally to the content-relevant ad serving operations 410 for all the Web page views by using a two-phase model. In the first phase, it is attempted to serve one or more ads using document information already stored (e.g., at cache 530, main repository 540 and/or CRAS repository 550) without sending the content to the content-relevant ad serving operations 410. If the document information is not already there, in the second phase, Javascript is provided to the browser which will send the 'interesting' content for the Web page for purposes of targeting ads. For example, a target page may include the following:

```
<iframe id='google_ads_frame'
 src=http://pagead.google.com/ads?url=document.location>
</iframe>
```

This iframe can get one or more content-relevant ad if document information or document relevance information (e.g., content) is available.

Otherwise, the iframe will get a Javascript that will fetch the document relevance information (e.g., contents). This scheme might not work well because of Javascript's 'Same Origin Policy'. The same origin policy implies that a frame in one domain (e.g., pagead.google.com) can not read contents of other domain (e.g., aol.com). Accordingly, the above two-phase approach may be modified as follows:

```
<iframe id='google_ads_frame'
src=http://pagead.google.com/ads?url=document.location>
</iframe>
....
Contents of the page
....
<script
src=http://pagead.google.com/ads?url=document.location&js_reque
st=true> </script>
```

Here, iframe will try to fetch one or more ads as before. If no document information, or document relevance information (e.g., content) is available, a house ad, or a blank ad, or an ad saying "place your ad here", may be returned. Script in the footer of the Web page issues its own parallel request with a special boolean 'js_request' flag set to "true". There are two possible responses to this request. First, a "null" response can occur when document information, or document relevance information (e.g., content) is available in cache 530 (or, alternatively, in cache 530, main repository 540, or CRAS repository 550) in which case the iframe would have already loaded one or more targeted ads. Second, a "Javascript to read the contents" response can occur when document information, or document relevance information (e.g., content) is not available in cache 530 (or, alternatively, in cache 530, main repository 540, or CRAS repository 550). In this second case, a script that will extract the document information (e.g., contents) or document relevance information as before is sent over to the browser and the iframe URL is set with the contents. Iframe will then fetch the targeted ads.

The two-phase approach is sometimes inefficient because the whole Javascript is sent to the browser when document information (content), or document relevance information is not available in cache 530 (or, alternatively, in cache 530, main repository 540 or CRAS repository 550). A third alternative is a three-phase Javascript which corresponds to the two-phase Javascript, with static link. This three-phase approaches exploits the browser's cache by returning a link to static Javascript to the browser. The browser will load the full Javascript only if necessary.

The three-phase approach always issues two requests to the content-relevant ad serving operations 410. Since these requests are in parallel they don't affect the end user latency. However, this causes additional backend load. Such additional backend load might be acceptable, however, since the second request in the 3-phase approach is relatively cheap to handle.

Figure 8:
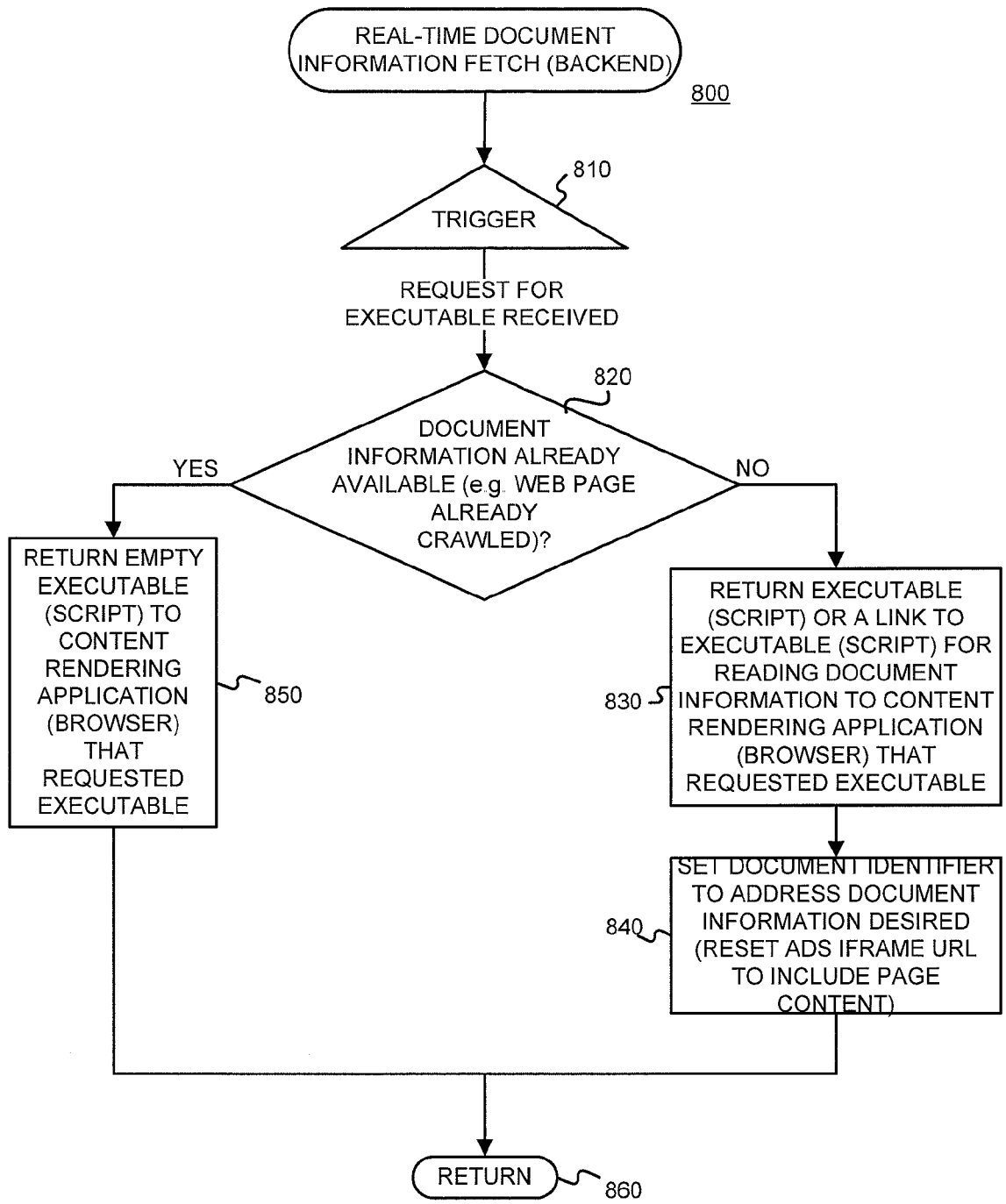
FIG. 8 is a flow diagram of an exemplary method that may be used to effect real-time document information retrieval in a manner consistent with principles of the invention.

FIG. 8 is a flow diagram of an exemplary method 800 that may be used to effect real-time document information retrieval in a manner consistent with principles of the invention. Both the two-phase and three-phase methods are shown. In response to a received request for an executable (e.g., Javascript) (Block 810), it is determined whether or not the document information is already available (e.g., at cache 530, or cache 530, main repository 540, or CRAS repository 550). (Decision block 820) If the document information is already available, an empty executable (e.g., empty script) is returned to the content rendering application (e.g., browser) that requested the executable (Block 850) before the method 800 is left (Node 860). If, on the other hand, the document information is not available, an executable for reading document information (e.g., Javascript) is returned (two-phase model), or a link to the executable for reading document information is returned (three-phase model), to the content rendering application (e.g., browser) that requested the executable (Block 830) and the document identifier is set to address the proper document information (e.g., ads iframe URL is reset to include page content) (Block 840) before the method 800 is left (Node 860).

A fourth alternative is a four-phase approach which avoids always issuing two requests by implementing the following trick. Iframe part is as before. The Javascript at the footer will try to read the contents of this iframe to figure out if it is showing the right ad. Iframe will get redirected to about:blank (which serves a blank ad, or an ad saying "place your ad here") if there is no document information or document relevance information (e.g., content) for the document available in cache 530. In this case, the Javscipt can read the contents of this iframe because it is not in a different domain. The existence of a security exception implies that the iframe has a good ad. Otherwise, the Javascript will get the document information or document relevance information (e.g., content) and get one or more targeted ads. However, the four-phase approach is a bit trickier to implement and requires some additional features of browsers (redirect, onload).

If it is assumed that (i) Javscipt size is 4 KB, (ii) the size of any URL with contents is 1 KB, (iii) browser caching hit rate is 90%, (iv) cached document information hit rate is 95%, and (v) browser cache hit rates and cached document information hit rates are independent, the three-phase technique offers a favorable combination of latency and bandwidth performance.

If, however, ad statistics are tracked, special considerations may be needed to get the actual number of Web page views seen. More specifically, if the document information or document relevance information (e.g., content) is not available in cache 530 (or in cache 530, main repository 540, or CRAS repository 550), two ad requests are issued. Consequently, page views could be overestimated which would corrupt many important stats like revenue per thousand impressions (RPM), etc. Although it is possible to not show ads (or show a static ad) in the iframe when the document information or document relevance information (e.g., content) is not there, this will corrupt statistics for pages that don't have the Javascript at the footer. Some content providers will not allow such a footer Javascript on privacy sensitive pages. One way to solve this challenge would be to add an additional flag in the iframe's URL to distinguish pages that do not have the footer Javascript.

Although the implementations described above used Javascript, the present invention is not limited to Javascript and may use some other script or executable. Moreover, in another alternative, a toolbar/client can be added to user's content rendering application (e.g., browser/OS) which can send the document information (e.g., Web page content) to the ad server. In yet another alternative, an http proxy may be used to snoop on all the document information (e.g., content) that goes to a user. This proxy can then send this document information to the ad server.

§4.2.1.2.1 Universal Root Document Locator

In the context of Web pages, to target ads based on the content of the Web page, to fetch the document information (e.g., content) of the Web page, the URL of the Web page where the ads are to appear is needed. FIG. 9A illustrates a Web page 900 with one or more ad spots. The Web page 900 includes content 910 and has a $URL_{MP}$ 915. The Web page 900 may also include one or more iframes 920a,920b, each iframe including its own URL 925a,925b. If script (or a pointer to script), such as that described above, is to be provided to allow the content-relevant ad server to fetch document information (e.g., content) of the Web page 900, a potential problem arises since the $URL_{MP}$ 915 of the main page may be different from those URLs 925a,925b of one or more iframes 920a,920b. More specifically, as shown in FIG. 9C, some content provider partners might place the script (or a pointer to the script) 930' directly on the main page 900" while, as shown in FIG. 9B, others may encapsulate the script (or a pointer to the script) 930a or 930b inside an iframe 920a or 920b with a different $URL_{IF1}$ 925a' or $URL_{IF2}$ 925b' from the $URL_{MP}$ 915' parent Web page 900'. If the script 930' is in the main Web page, such as shown in FIG. 9C, a first Javascript attribute, "document.location", is used to identify the location ($URL_{MP}$) 915" of the main Web page 900". If, on the other hand, the script 930a or 930b is in an iframe 920a or 920b, such as shown in FIG. 9B, a second Javascript attribute, "document.referrer", is used to identify the location ($URL_{MP}$) 915' of the main Web page 900", instead of returning the $URL_{IF1}$ 925a' or $URL_{IF2}$ 925b' of the iframe. Variants such as "window.document.location", etc., may be used instead. In any event, in order for the script to get the appropriate document information (e.g., content 910), it needs the proper $URL_{MP}$ and therefore needs to know which of the two methods—document.location or document.referrer—to use. Although different content provider partners could be provided with different Javascript for use in these two cases, doing so complicates matters and relies on partners to use the right script for the right page.

Figure 10:
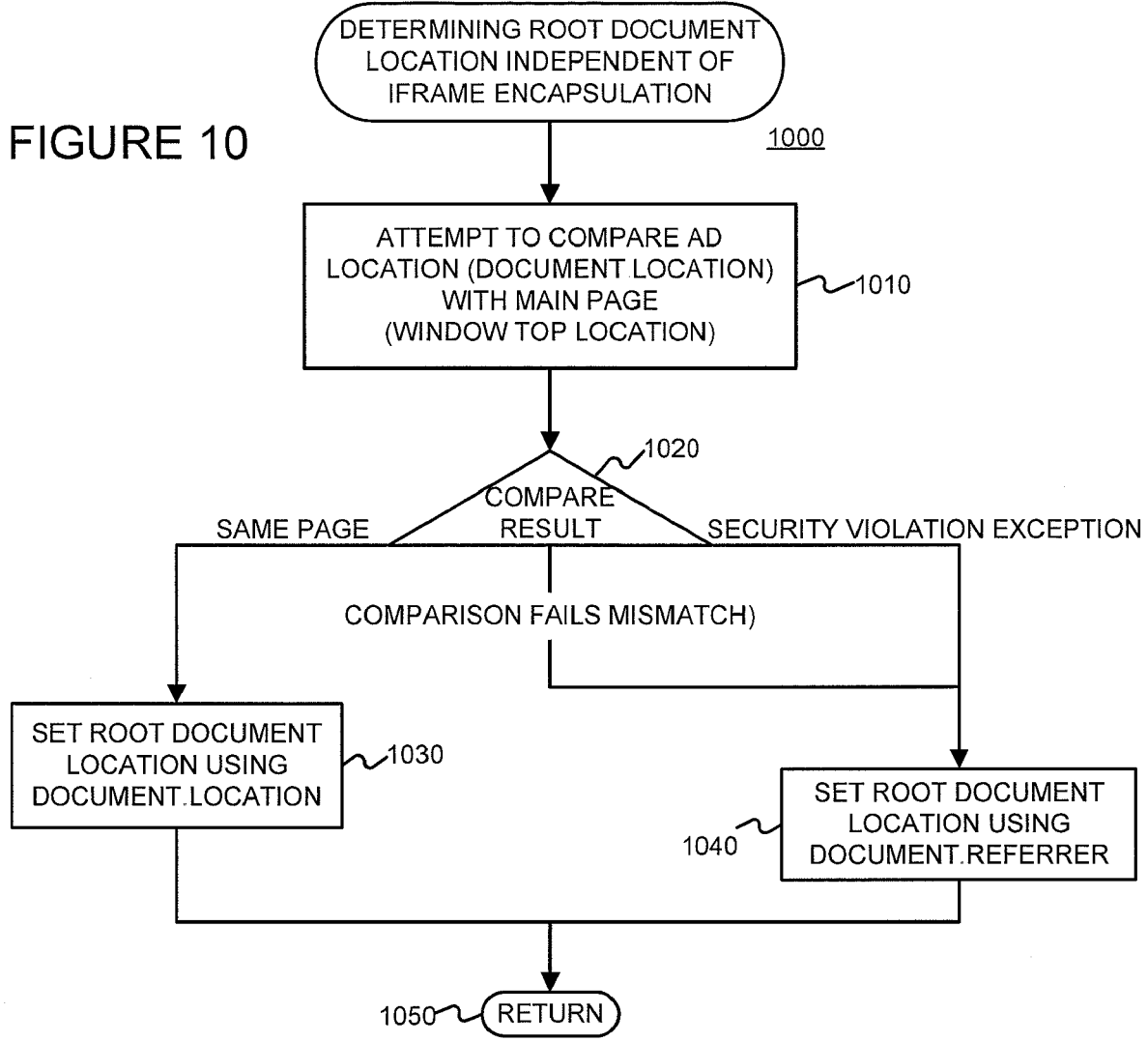
FIG. 10 is a flow diagram of an exemplary method that may be used to determine root document location in a manner consistent with principles of the present invention.

FIG. 10 is a flow diagram of an exemplary method 1000 for determining which of the two root document determination methods to use, in a manner consistent with the principles of the present invention. This method 1000 leverages the iframe security model and Javascript exception handling. Comparing the ad location ("document.location") with the main page ("window.top.location") is attempted. (Block 1010) If they are the same, the "document.location" method is used to determine the root document. (Blocks 1020 and 1030) If they are not the same, the comparison either fails (if the main page and iframe are in the same domain), or generates a security violation exception (an iframe may not examine values outside of itself). In the event of a mismatch or exception, the "document.referrer" method is used to identify the root document (main page) location. (Blocks 1020 and 1040) This use of exception handling with iframe security models provides a powerful and novel way to determine the main page $URL_{MP}$.

In one embodiment, the Javascript "onerror" exception handling is used. An alternative approach would be to employ "try/catch" exception handling.

§4.2.1.3 Alternative Ways of Obtaining Document Information

There can be several alternative implementations of the fetch-on-miss scheme described in §4.2.1.1 above. Such alternatives can be achieved by combining the following implementation options in different ways:
1. When to fetch document information
   a) fetch before request (pre-fetch)
   b) fetch-on-miss during request (on-demand blocking fetch)
   c) fetch-on-miss after request (on-demand non-blocking fetch)
2. What document information to fetch
   a) fetch just the Web page itself
   b) fetch the Web page and follow its links
3. How to fetch
   a) use a separate crawler
   b) fetcher embedded in the content-relevant ad targeting system.

The implementation described above uses a separate crawler (Recall 580 of FIG. 5.) and fetches the Web page and its links before a request (pre-fetch). If document information needed to processes a request is not available, the Web page is fetched after the request has already been served (e.g., by providing no ads or "house ads". (Recall blocks 670 and 675 of FIG. 6, and FIG. 7.) However, there can be other variations.

The document information may be subject to further processing after it is fetched.

§4.2.2 Determining Relevance Information for Ads and/or Content

Referring back to FIG. 4, recall that content-relevant ad serving operations 410 may include relevance information extraction and/or generation operations 412. Various way of extracting and/or generating relevance information are described in U.S. Provisional Application Ser. No. 60/413,536, entitled "METHODS AND APPARATUS FOR SERVING RELEVANT ADVERTISEMENTS", filed on Sep. 24, 2002 and listing Jeffrey A. Dean, Georges R. Harik and Paul Bucheit as inventors, and in U.S. patent application Ser. No. 10/314,427, entitled "METHODS AND APPARATUS FOR SERVING RELEVANT ADVERTISEMENTS", filed on Dec. 6, 2002 and listing Jeffrey A. Dean, Georges R. Harik and Paul Bucheit as inventors. Both of these applications are incorporated herein by reference. These applications are referred to collectively as "the relevant ad server applications") Relevance information may be considered as a topic or cluster to which an ad or document belongs. U.S. Provisional Application Ser. No. 60/416,144, entitled "Methods and Apparatus for Probabilistic Hierarchical Inferential Learner" filed on Oct. 3, 2002 (incorporated herein by reference) describes exemplary ways to determine one or more concepts or topics (referred to as "phil clusters") of information that may be used consistent with the principles of the present invention.

In one exemplary embodiment of the present invention, off-line (perhaps nightly), a dump of a complete ads database is used to generate an index that maps topics (e.g., a phil cluster identifiers) to a set of matching ad groups. This may be done using one or more of (i) a set of serving constraints (targeting criteria) within the ad group, (ii) text of the ads within the ad group, (iii) content on the advertiser's Web site, etc.

§4.2.3 Associating Content with Relevant Ads

Recall from FIG. 4 that content-relevant ad serving operations 410 may include ad-document relevance information comparison operations 414 and ad(s)-document association operations 416. Various similarity techniques, such as those described in the relevant ad server applications, may be used to determined a degree of similarity between an ad and a document. Such similarly techniques may use the extracted and/or generated relevance information. One or more content-relevant ads may then be associated with a document based on the similarity determinations. For example, an ad may be associated with a document if its degree of similarity exceeds some absolute and/or relative threshold.

In one exemplary embodiment of the present invention, a document may be associated with one or more ads by mapping a document identifier (e.g., a URL) to one or more ads. For example, the document information may have been processed to generate relevance information, such as a cluster (e.g., a phil cluster), a topic, etc. The matching clusters may then be used as query terms in a large OR query to an index that maps topics (e.g., a phil cluster identifiers) to a set of matching ad groups, such as one determined as described in §4.2.2. The results of this query may then be used as first cut set of candidate targeting criteria. The candidate ad groups may then be sent to the relevance information extraction and/or generation operations (e.g., a phil server) again to determine an actual information retrieval (IR) score for each ad group summarizing how well the criteria information plus the ad text itself matches the document relevance information. Estimated or known performance parameters (e.g., click-through rates, conversion rates, etc.) for the ad group may be considered in helping determine the best scoring ad group.

Once a set of best ad groups have been selected, a final set of one or more ads may be selected using a list of criteria from the best ad group(s). The content-relevant an ad server can use this list to request that an ad be sent back if K of the M criteria sent match a single ad group. If so, the ad is provided to the requestor.

Performance information (e.g., a history of selections or conversions per URL or per domain) may be fed back in the system, so that clusters or Web pages that tend to get better performance for particular kinds of ads (e.g., ads belonging to a particular cluster or topic) may be determined. This can be used to re-rank content-relevant ads such that the ads served are determined using some function of both content-relevance and performance. A number of performance optimizations may be used. For example, the mapping from URL to the set of ad groups that are relevant may be cached to avoid re-computation for frequently viewed pages.

§4.2.4 Combining Relevant Ads with an Associated Document

Content-relevant ads can be combined with an associated document ahead of time, or on-demand, in real-time. Such combination may be performed by (a) the content-relevant ad server, (b) the content provider, or (c) the end user's content rendering application (e.g., browser).

§4.2.5 Exemplary Ad Server Using the Principles of the Present Invention

If the present invention is to be used in an ad server, a number of the following components may be provided.

§4.2.5.1 Accounting and Billing

In one embodiment of the invention, each syndication partner (e.g., a content provider) may be assigned a different billing identifier. The ad system may track impression and performance information (e.g., selections, conversions, etc.)

on a per-client basis, particularly if there are a reasonable number of syndication partners.

§4.2.5.2 Reporting to Advertisers

In one embodiment of the invention, an advertiser may be provided with a summary including which of its ads were shown on which Web sites or Web pages.

§4.2.5.3 Serving Ads Across Multiple Web Sites

In one embodiment of the invention, advertisers may have no control over where their ads shown—on an Web page, on the search results page generated by a search engine, etc. In a refined embodiment of the present invention, advertisers can control how their ads are served. Such control may be effected by allowing the advertiser to opt-in, opt-out, manipulate bidding or budgeting controls, etc. For example, a binary opt-in/opt-out choice may be made by the advertiser, or inferred by the advertiser's inaction. Alternatively, advertisers can be provided with the ability to provide a second price (and possibly additional prices) for each ad group that they would be willing to pay for "clicks on content-relevance-based targeted pages" (which could be content-relevance-based ads, or ads on search pages that match the concept of their targeting criteria but not the actual keywords). In this alternative scheme, advertisers could completely opt out by bidding 0 for results (e.g., clicks, conversions, etc.).

§4.2.5.4 Filtering of Ads

In one embodiment of the invention, it may be desirable to control or filter the rendering of ads shown in conjunction with certain documents. For example, ad syndication partners may be provided some control over the ads shown in conjunction with their documents (e.g., shown on or in conjunction with their Web site or Web page). One simple way of providing such control would be to permit the syndication partners to use a blacklist of URLs for advertisers (e.g., competitors, unreputable firms, etc.), or terms of ads (e.g., inappropriate products, services, or terms), that should not be allowed. More specifically, advertisers may be allowed to associate "negative keywords" with an advertisement or advertising campaign, where advertisements are only shown if a search-engine query does NOT match the negative keywords. For example, a percussion instrument store might choose to advertise on the keyword "drums", but might choose to use the negative keyword "ears", so that they didn't match queries like "ear drums". This approach is fairly labor intensive and error-prone. In one embodiment of the invention, content publishers or advertiser are permitted to specify negative preferences in several ways.

First, they can be permitted to select an option that says "No competitor ads". In a refinement of this embodiment, the competitors of a given advertiser or publisher can be automatically identified by analyzing the textual content of their Website, advertisements, and/or targeting criteria compared with other advertisers, and also analyze the link structure surrounding a page to identify additional competitors or related pages for which advertisements should not be shown.

Second, they can be permitted to select an option that says "No advertisements related to this text or URL(s)", where the text could be a few words, or it could be an entire web site. If the user specifies a URL, the page can then be fetched from the Website hosting the URL and the contents of the Web page can be used in addition to the URL to derive more text. Fetching related pages, such as the pages pointed to by the original URL(s), or pages on the same host, or related pages identified by co-citation or other algorithms for identifying related pages from a URL can also be considered. Given a set of text, a clustering system such as the one introduced above, can be used to derive a set of clusters or topics that are related to the negative text. For example, the percussion store might specify "ear drums" as negative text, and this could be generalized into all "concepts" related to ears, hearing loss, etc. The generalization could be done in a variety of ways, including via a Bayesian network looking for higher-than-normal co-occurrence of words in queries or documents that match the given negative text. This might expand "ear drums" into a cluster of related phrases such as: # ear ringing # ear buzzing # ear wax buildup # patulous eustachian tube # human ear diagram # ear blockage # eustachian tube # ear pressure # ear noise # middle ear fluid # ear pain # ear lavage # ear popping # eustachian tube dysfunction # pain in ear # ear fullness # ear tube. Clusters of concepts/related words that should not match can also be identified. For example "ear drums" might expand into a cluster of related words and associated probabilities (show in parentheses): Activated Outlink Sum: 0.594601 14971 ear (0.090718,inf) Im 7434 hearing (0.0450492,inf) Im 4509 hearing-loss (0.0273237,inf) Im 2735 ears (0.0165727,inf) Im 1358 inner-ear (0.00822975, inf) Im 1358 deafness (0.00822975,inf) Im 1501 tinnitus (0.00909528,inf) Im 823 audiogram (0.00499159,inf) Im 823 middle-ear (0.00499159,inf) Im 1833 problems (0.011109, inf) Im 745 ear-infection (0.00451658,inf) Im 1006 noise (0.00609675,inf) Im 910 fluid (0.00551656,inf) Im 910 damage (0.00551656,inf) Im 552 ear-infections (0.00334597,inf) Im 552 audiology (0.00334597,inf) Im 409 sensorineural-hearing-loss (0.00247875,inf) Im 745 loss (0.00451658,inf) Im 370 glue-ear (0.00224287,inf) Im 452 auditory (0.00273944,inf) Im 409 otitis-media (0.00247875,inf) Im 370 acoustic-neuroma (0.00224287,inf) Im 303 conductive-hearing-loss (0.0018363,inf) Im 452 loud (0.00273944,inf) Im 303 audiometry (0.0018363,inf) Im 1006 test (0.00609675,inf) Im 274 in-the-ears (0.00166156,inf) Im 303 fullness (0.0018363,inf) Im 334 ear-wax (0.00202943,inf) Im 823 sound (0.00499159,inf) Im 552 pressure (0.00334597, inf) Im 274 otosclerosis (0.00166156,inf) Im 274 ear-drum (0.00166156,inf) Im 274 cholesteatoma (0.00166156,inf) Im 452 canal (0.00273944,inf) Im 370 ent (0.00224287,inf) Im 224 sensorineural (0.00136037,inf) Im Once this expansion has been done, it can be used to either transparently suppress advertisements that have a strong association with the given cluster, or it could be used in an iterative system, by showing advertisers or publishers the kinds of content/advertisements that would be suppressed by an existing set of rules, and allowing them to iteratively refine the matching rules.

Third, an advertiser or publisher could be allowed to suppress ads that are perform poorly (e.g., that are below a given performance parameter such as clickthrough rate, conversion rate, etc. or below a given effective cost per impression (clickthrough rate times cost per click).

§4.2.5.5 Imposing Serving Limits on Otherwise Content-Relevant Ads

In one exemplary embodiment of the present invention, showing the same ad to the same user more than a predetermined number of times over a predetermined time period (e.g., once per day), or some similar heuristic is avoided. Otherwise, in the context of the Internet, if a user surfs around a number of Web pages with similar content, they are likely to see the same ad repeatedly, which may hurt performance of the ad.

§4.2.5.6 Gathering Statistics

In one embodiment of the present invention, content-ads serving statistics are gathered (e.g., for system debugging, revenue projection, customer report and billing, etc.). In one embodiment, one or more of the following statistics:

```
<12 page views> <12 page views with real ads>
<$ money spent (for buying page views)>
<12 ads shown> <12 real ads shown>
<$ money made (from ads clicks)>
<% clickthrough>
<$ rpm>
``` are determined. Such statistics may be determined on a per-partner basis:

A separate log concentrator and ads database may be used for collecting and storing these statistics.

As discussed above, for content-relevant-ads serving, it may be desirable to show canned "house ads" when there are no ads determined to be relevant to a document. This may be done to fully exploit pre-purchased properties; namely documents with pre-purchased ad spots. To be able to distinguish statistics for both types of ads (e.g., house ads vs. ads determined to be relevant), in an ads database, two sub-properties are created for each content-relevant-ads property, one for each ad type (real or house ads). For example, the Web property www.ezboard.com may be split into two sub-properties: (i) ca-ezboard and (ii) ca-ezboard:default. When sending an ads request, the content-ads-server chooses which sub-property to use based on the web property and the ads type.

§4.2.6 Exemplary Apparatus

Figure 11:
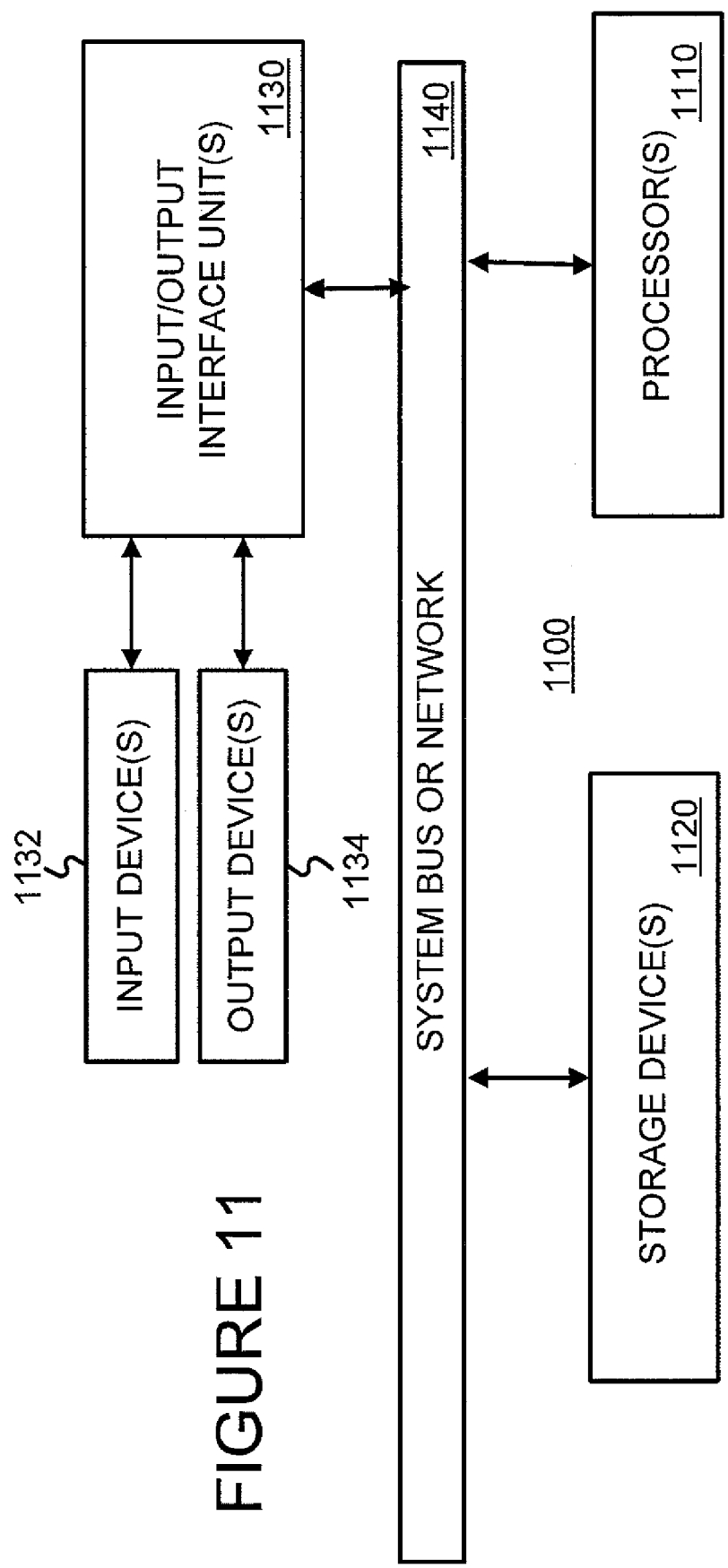
FIG. 11 is a high-level block diagram of apparatus that may be used to effect at least some of the various operations that may be performed and store at least some of the information that may be used and/or generated consistent with principles of the present invention.

FIG. 11 is high-level block diagram of a machine 100 that may effect one or more of the operations discussed above. The machine 1100 basically includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130.

The one or more processors 1110 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1120 and/or may be received from an external source via one or more input interface units 1130.

In one embodiment, the machine 1100 may be one or more conventional personal computers. In this case, the processing units 1110 may be one or more microprocessors. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1132, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1110 through an appropriate interface 1130 coupled to the system bus 1140. The output devices 1134 may include a monitor or other type of display device, which may also be connected to the system bus 1140 via an appropriate interface. In addition to (or instead of) the monitor, the personal computer may include other (peripheral) output devices (not shown), such as speakers and printers for example.

§4.2.7 Serving of the Ads

There are many ways in which ads determined to be relevant based on the foregoing methods may be served in conjunction with documents. For example, Web sites often show advertisements in the form of banner ads. When showing an ad consistent with the present invention, ads may be placed into a form that may be shown in such a banner position. For example, an ad may be converted into an image of the appropriate size, and shown in the banner position. Based on the relative sizes of the ad serving location (e.g. banner position), ads and/or additional information can be shown. In the case of text ads, one or more ads may be served in the place of a normal banner ad; alternatively, an ad may be complemented or supplemented by additional useful or interesting information and shown. Such additional information might include, for example, product reviews, news stories related to a product or service, additional sources of information relevant to the advertisement or the document, including suggested queries that will provide the user with additional information (e.g. "Query Google for _____ to learn more about _____"), etc. Alternatively, it may be preferred to include an iframe on the document, and to serve ads (such as text ads) via the iframe.

§4.3 Examples of Operations

In one application of the present invention, document information such as a URL or a snippet of text is received and user to return zero or more content-relevant ads. FIGS. 12 and 13 are messaging diagrams illustrating two alternative schemes for processing ad requests.

FIG. 12 illustrates a scheme in which a content provider requests ads, is provided with ads and inserts the ads into one of their Web pages. More specifically, responsive to a content request 1240 from a user 1210, a content provider 1220 submits an ad request 1250 to a content-relevant ad server 1230. The content-relevant ad server 1230 serves this request 1250, as described above for example, and returns content-relevant ads 1270 to the content provider 1220. The content provider then returns the requested content with one or more of the content-relevant ads inserted 1260 to the user 1210.

FIG. 13 illustrates a scheme in which a content provider returns content containing links to a content-relevant ad server, and an ad request is made by the end user's browser as it renders the page. More specifically, responsive to a content request 1340 from a user 1310, a content provider 1320 returns the requested content with embedded ad commands 1350. The user's browser 1310 effects the embedded ad commands 1350 to effectively submit an ad request 1360 to a content-relevant ad server 1330. Responsive to this ad request 1360, the content-relevant ad server 1330 servers this request 1360, as described above for example, and returns content-relevant ads 1370 to the user's browser 1310 for insertion onto the content. In one embodiment, the content-relevant ads 1370 could include gif-based image ads, text-based ads using iframes, etc.

In either of the schemes described above with reference to FIGS. 12 and 13, the content-relevant ad server can user one or more pieces of information to determine content-relevant ads. Such information may include, for example, text of the Web page itself. Such text may be fetched from a repository.

Alternatively, the contents (or a digested form of the contents) could be provided by the content provider (e.g., in ad request 1250). In yet another alternative, a digested form of the contents (e.g. 50 words, with preference given to important title and large font words) can be computed with a small amount of Javascript embedded on any HTML page and then provide a reasonable summary of the contents of the page (the digested content would be sent in addition to the URL as part of the ad request) (e.g., in ad request 1360). Other information may include a per-Web site or per-group-of-pages summary information, pre-computed off-line. Still other information may include anchor text for the Web page/Web page collection/host, or information about the Web page/Web page collection/host, that returned this page as part of search engine queries. This is because people may put textual descriptions in anchor text.

§4.4 CONCLUSIONS

As can be appreciated from the foregoing disclosure, the invention can be used to expand situations in which targeted can be used.

What is claimed is:

1. A computer-implemented method comprising:
    a) accepting a request for content-relevant advertisements for rendering with a document for presentation to a user, the request including a document identifier of the document;
    b) responsive to the request and using the document identifier, determining whether or not document information of the document is available locally;
    c) when it is determined that the document information of the document is not available locally, performing one of:
        (i) using a script to have a content rendering application provide document information of the document,
        (ii) retrieving document information of the document immediately, or
        (iii) saving the document identifier for later retrieval of document information of the document,
    otherwise, when it is determined that the document information of the document is available locally, performing at least one of (i) extracting document relevance information using the document information, or (ii) generating document relevance information using the document information; and
    d) targeting the serving of content-relevant advertisements to the content of the document, identified by the document identifier, using the document information of the document,
    wherein the act of using a script to have a content rendering application provide document information of the document is performed and includes
    returning executable instructions for reading document information of the document to the content rendering application; and
    setting, with the content rendering application, a document identifier, to address desired document information of the document.

2. A computer-implemented method comprising:
    a) accepting a request for content-relevant advertisements for rendering with a document for presentation to a user, the request including a document identifier of the document;
    b) responsive to the request and using the document identifier, determining whether or not document information of the document is available locally;
    c) when it is determined that the document information of the document is not available locally, performing one of:
        (i) using a script to have a content rendering application provide document information of the document,
        (ii) retrieving document information of the document immediately, or
        (iii) saving the document identifier for later retrieval of document information of the document,
    otherwise, when it is determined that the document information of the document is available locally, performing at least one of (i) extracting document relevance information using the document information, or (ii) generating document relevance information using the document information; and
    d) targeting the serving of content-relevant advertisements to the content of the document, identified by the document identifier, using the document information of the document,
    wherein the act of using a script to have a content rendering application provide document information of the document is performed and includes
    returning a link to executable instructions for reading document information of the document to the content rendering application; and
    setting, with the content rendering application, a document identifier, to address desired document information of the document.

3. A computer-implemented method comprising:
    a) accepting a request for content-relevant advertisements for rendering with a document for presentation to a user, the request including a document identifier of the document;
    b) responsive to the request and using the document identifier, determining whether or not document information of the document is available locally;
    c) when it is determined that the document information of the document is not available locally, performing one of:
        (i) using a script to have a content rendering application provide document information of the document,
        (ii) retrieving document information of the document immediately, or
        (iii) saving the document identifier for later retrieval of document information of the document,
    otherwise, when it is determined that the document information of the document is available locally, performing at least one of (i) extracting document relevance information using the document information, or (ii) generating document relevance information using the document information; and
    d) targeting the serving of content-relevant advertisements to the content of the document, identified by the document identifier, using the document information of the document,
    wherein it is determined that the document information of the document is not available locally,
    wherein it is determined that the document is hard to crawl, and
    wherein that act of using a script to have a content rendering application provide document information of the document is performed.

4. The computer-implemented method of claim 3 wherein the document is a Web page and the document identifier is a URL.

5. The computer-implemented method of claim 3 wherein the document information of the document is textual content.

6. The computer-implemented method of claim 3 wherein it is determined that the document information of the document is available locally.

7. The computer-implemented method of claim 3 wherein it is determined that the document information of the document is not available locally and that the document identifier is saved for later retrieval of the document information of the document, the computer-implemented method further comprising,
   e) serving at least one of (A) a house advertisement, (B) a blank advertisement, (C) a random advertisement, or (D) a well performing advertisement without regard to its relevance.

8. The computer-implemented method of claim 3 wherein it is determined that the document information of the document is not available locally.

9. A computer-implemented method comprising:
   a) accepting a request for content-relevant advertisements for rendering with a document for presentation to a user, the request including a document identifier of the document;
   b) responsive to the request and using the document identifier, determining whether or not document information of the document is available locally;
   c) when it is determined that the document information of the document is not available locally, performing one of:
      (i) using a script to have a content rendering application provide document information of the document,
      (ii) retrieving document information of the document immediately, or
      (iii) saving the document identifier for later retrieval of document information of the document,
   otherwise, when it is determined that the document information of the document is available locally, performing at least one of (i) extracting document relevance information using the document information, or (ii) generating document relevance information using the document information; and
   d) targeting the serving of content-relevant advertisements to the content of the document, identified by the document identifier, using the document information of the document,
   wherein it is determined that the document information of the document is not available locally,
   wherein it is determined that both (1) the document is not hard to crawl and (2) the content-relevant ad server is configured to be non-blocking, and
   wherein the act of retrieving the document information of the document immediately is performed.

10. A computer-implemented method comprising:
    a) accepting a request for content-relevant advertisements for rendering with a document for presentation to a user, the request including a document identifier of the document;
    b) responsive to the request and using the document identifier, determining whether or not document information of the document is available locally;
    c) when it is determined that the document information of the document is not available locally, performing one of:
       (i) using a script to have a content rendering application provide document information of the document,
       (ii) retrieving document information of the document immediately, or
       (iii) saving the document identifier for later retrieval of document information of the document,
    otherwise, when it is determined that the document information of the document is available locally, performing at least one of (i) extracting document relevance information using the document information, or (ii) generating document relevance information using the document information; and
    d) targeting the serving of content-relevant advertisements to the content of the document, identified by the document identifier, using the document information of the document,
    wherein it is determined that the document information of the document is not available locally,
    wherein it is determined that both (1) the document is not hard to crawl and (2) the content-relevant ad server is configured to be blocking, and
    wherein the act of saving the document identifier for later retrieval is performed.

11. Apparatus comprising:
    a) an input for accepting a request for content-relevant advertisements for rendering with a document for presentation to a user, the request including a document identifier of the document;
    b) at least one processor; and
    c) at least one storage device storing processor executable instructions which, when executed by the at least one processor, perform a method comprising,
       determining, responsive to the request and using the document identifier, whether or not document information of the document is available locally;
       when it is determined that the document information of the document is not available locally, performing one of:
          (i) using a script to have a content rendering application provide document information of the document,
          (ii) retrieving the document information of the document immediately, or
          (iii) saving the document identifier for later retrieval of document relevance information of the document,
       otherwise, when it is determined that the document information of the document is available locally, performing at least one of (i) extracting document relevance information using the document information, or (ii) generating document relevance information using the document information; and
       targeting the serving of content-relevant advertisements to the content of the document, identified by the document identifier, using the document information of the document,
    wherein it is determined that the document information of the document is not available locally,
    wherein it is determined that the document is hard to crawl, and
    wherein that act of using a script to have a content rendering application provide document information of the document is performed.

12. The apparatus of claim 11 wherein the document is a Web page and the document identifier is a URL.

13. The apparatus of claim 11 wherein the document information of the document is textual content.

14. The apparatus of claim 11 wherein it is determined that the document information is available locally.

15. The apparatus of claim 11 wherein it is determined that the document information of the document is not available locally and that the document identifier is saved for later retrieval of the document information of the document, and wherein the method further comprises serving at least one of (A) a house advertisement, (B) a blank advertisement, (C) a random advertisement, or (D) a well performing advertisement without regard to its relevance information.

16. The apparatus of claim 11 wherein it is determined that the document information of the document is not available locally.

17. Apparatus comprising:
a) an input for accepting a request for content-relevant advertisements for rendering with a document for presentation to a user, the request including a document identifier of the document;
b) at least one processor; and
c) at least one storage device storing processor executable instructions which, when executed by the at least one processor, perform a method comprising,
   determining, responsive to the request and using the document identifier, whether or not document information of the document is available locally;
   when it is determined that the document information of the document is not available locally, performing one of:
     (i) using a script to have a content rendering application provide document information of the document,
     (ii) retrieving the document information of the document immediately, or
     (iii) saving the document identifier for later retrieval of document relevance information of the document,
   otherwise, when it is determined that the document information of the document is available locally, performing at least one of (i) extracting document relevance information using the document information, or (ii) generating document relevance information using the document information; and
targeting the serving of content-relevant advertisements to the content of the document, identified by the document identifier, using the document information of the document,
wherein it is determined that the document information of the document is not available locally,
wherein it is determined that both (1) the document is not hard to crawl and (2) the content-relevant ad server is configured to be non-blocking, and
wherein the act of retrieving the document information of the document immediately is performed.

18. Apparatus comprising:
a) an input for accepting a request for content-relevant advertisements for rendering with a document for presentation to a user, the request including a document identifier of the document;
b) at least one processor; and
c) at least one storage device storing processor executable instructions which, when executed by the at least one processor, perform a method comprising,
   determining, responsive to the request and using the document identifier, whether or not document information of the document is available locally;
   when it is determined that the document information of the document is not available locally, performing one of:
     (i) using a script to have a content rendering application provide document information of the document,
     (ii) retrieving the document information of the document immediately, or
     (iii) saving the-document identifier for later retrieval of document relevance information of the document,
   otherwise, when it is determined that the document information of the document is available locally, performing at least one of (i) extracting document relevance information using the document information, or (ii) generating document relevance information using the document information; and
targeting the serving of content-relevant advertisements to the content of the document, identified by the document identifier, using the document information of the document,
wherein it is determined that the document information of the document is not available locally,
wherein it is determined that both (1) the document is not hard to crawl and (2) the content-relevant ad server is configured to be blocking, and
wherein the act of saving the document identifier for later retrieval is performed.

* * * * *